May 29, 1928.  
R. H. TRAVERS  
SHOCK ABSORBER  
Filed Dec. 3, 1926
1,671,658
2 Sheets-Sheet 2
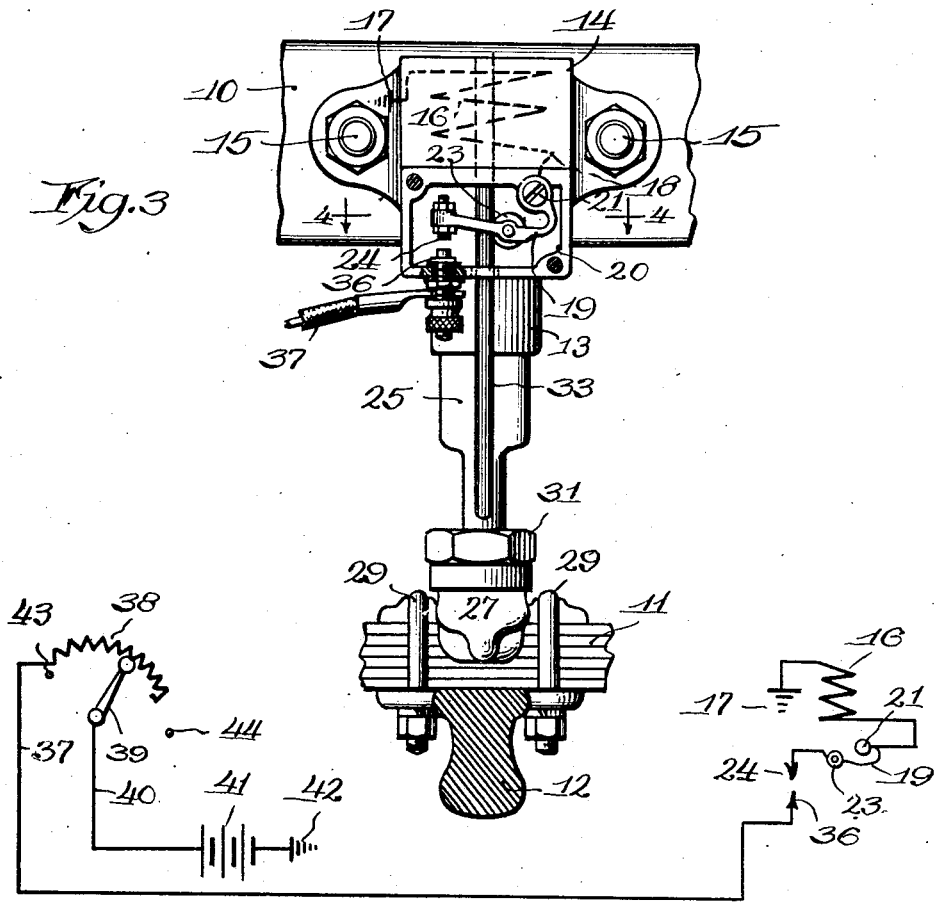
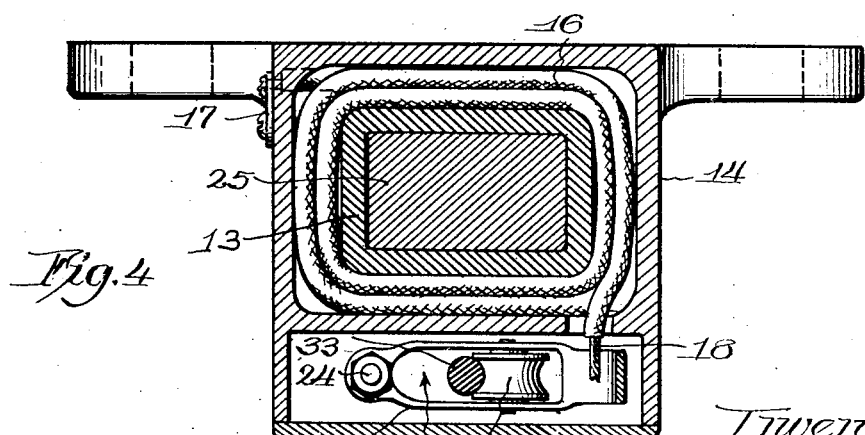
Inventor,  
Richard H. Travers, Patented May 29, 1928.

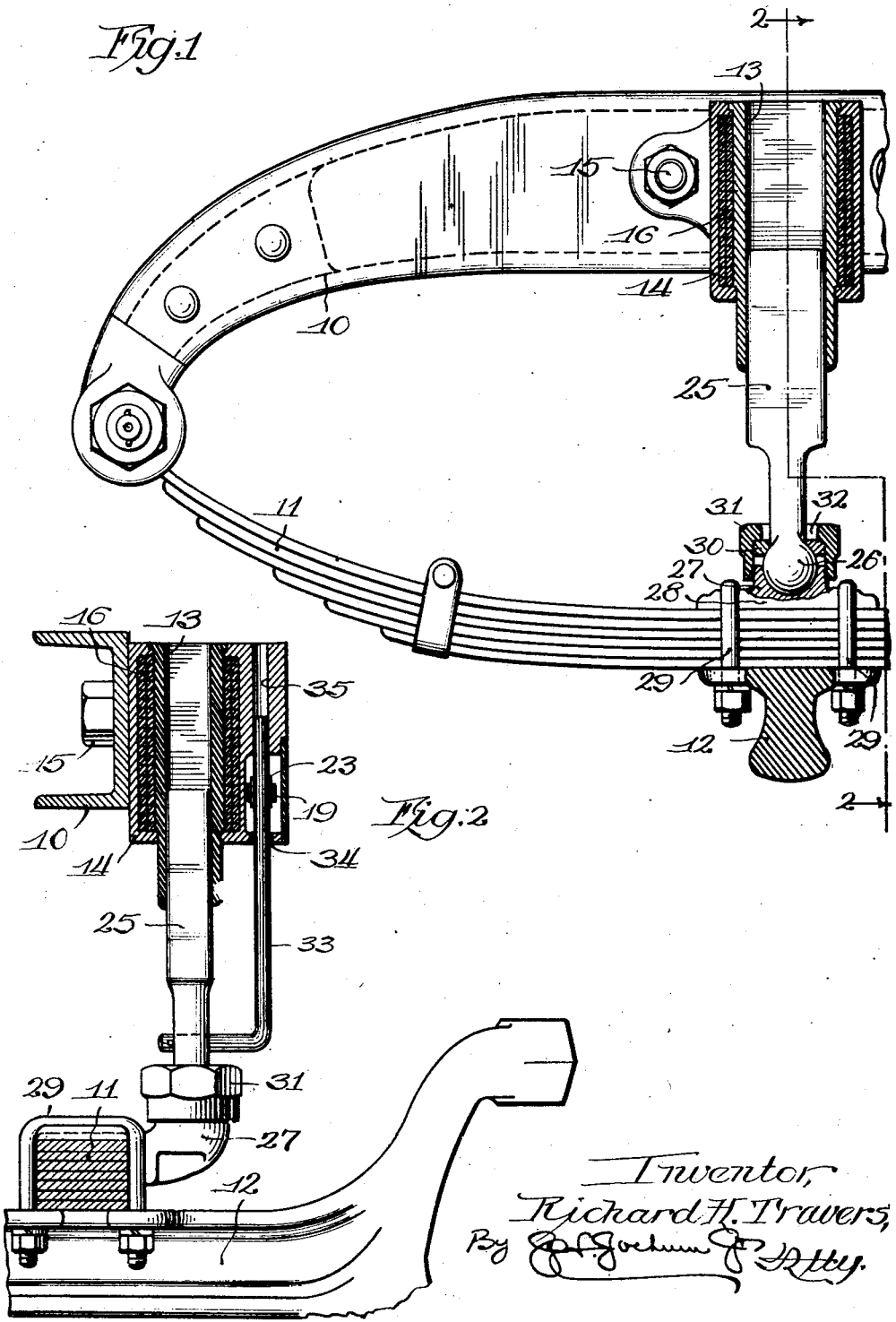

1,671,658

UNITED STATES PATENT OFFICE.

RICHARD H. TRAVERS, OF CHICAGO, ILLINOIS.

SHOCK ABSORBER.

Application filed December 3, 1926. Serial No. 152,316.

This invention relates to improvements in devices for controlling or modifying the relative movement of bodies, and is particularly adapted, though not necessarily limited in its use, in connection with vehicle supporting springs whereby the excessive vibration of the spring and the sudden shock or jolting of the vehicle will be overcome, and is adapted to be applied to a vehicle in such a way as to permit free yielding of the springs under compressive stresses but to modify and control the reflex action or rebound of the springs.

A further object is to provide an improved device of this character embodying electromagnetic means for retarding or controlling the reflex action of the spring, and improved means whereby the intensity of the magnetic field may be varied at will, thereby enabling an extremely wide range of degree of resistance possible to create by the use of this device.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention and in which:

Figure 1 is a view partly in side elevation and partly in vertical section, with parts broken away, of a vehicle spring, having a shock absorber constructed in accordance with the principles of this invention applied thereto.

Figure 2 is a view taken on line 2—2, Figure 1.

Figure 3 is a right hand elevation of Figure 2.

Figure 4 is a detail sectional view taken on line 4—4, Figure 3.

Figure 5 is a wiring diagram.

Referring more particularly to the drawings the numerals 10 and 11 designate two bodies, the relative movements of which it is desired to control, such as a portion of the frame of a vehicle and a vehicle spring, to which latter is secured in the usual manner, the axle 12.

The numeral 13 designates the core of an electro-magnetic device such as a solenoid which is arranged within a casing 14, the casing being secured as at 15 to the body or member 10.

The casing 14 is of an internal diameter somewhat greater than the core of the solenoid so that the windings 16 may be housed between the core and the casing. One end of the winding is grounded as at 17 and the other end 18 of the winding is connected with a member 19 arranged within a housing 20. The member 19 is preferably in the form of a spring, one end of which is anchored as at 21, the anchor screw forming a binding post or terminal for the end 18 of the windings 16 of the magnet.

The member 19 is provided with an elongated opening 22 therethrough and in this opening is arranged an anti-friction roller 23, the member 19 carrying at its free end a contact point 24.

One end of the armature 25 of the solenoid telescopes into the core 13 of the magnet, and the free end of the armature is connected with the body or spring 11 in any suitable manner, such as by means of a ball and socket joint formed by shaping the end of the armature 26 into a ball adapted to be seated in a seat 27 carried by a member 28 fastened to the axle 12 by means of the usual clips 29.

A split washer 30 is provided to encompass the armature above the ball 26 and a cap 31 is threaded upon the seat 27 for holding the parts together. The cap is provided with an opening 32 of a diameter somewhat larger than the greatest diameter of the ball 26, so as to permit of assembling of the parts and at the same time to permit of a free pivotal or universal movement of the armature 25 with respect to the member or body 11.

It will therefore be seen that as the members 10 and 11 are moved relatively towards each other one with relation to the other the armature 25 will slide within the magnet and the ball and socket joint will prevent binding of the parts and will permit such movement of the armature.

Connected with the armature is a rod 33 preferably formed of any suitable insulating material. This rod 33 is guided through an opening 34 in the bottom of the chamber in which the member 19 is arranged and a guideway 35 is also provided for guiding the rod 33.

The rod 33 is held against lateral movement by reason of its attachment with the armature 25 and the guides and the stress of the spring 19 tends to hold the roller 23 in contact with the rod 33, so that when the spring or body 11 moves upwardly towards the body or member 10, the frictional binding between the roller 23 and the rod 33 will cause the rod to raise or deflect the spring 19 so as to move the contact 24 carried by the spring out of engagement with the contact 36, the latter being connected by means of a conductor 37 to the source of supply of electric energy.

When the members 10 and 11 are relatively moved in a direction to separate them the rod 33 will be lowered, and as the member 19 is frictionally bound to the rod 33 a lowering movement of the rod will move the spring 19 in a direction to cause the contact 24 to engage the contact 36 and thereby complete the circuit through the magnet. Should the contact 24 engage the contact 36 before the body or member 11 has reached the limit of its movement away from the body or member 10, the roller 23 will rotate after contact 24 engages the contact 36, and this will permit the rod 33 to slide with respect to the member 19.

Thus it will be seen that by the relative movement of the members or bodies 10 and 11 in one direction with respect to each other the contacts 24—36 will be separated, while the relative movement of the members or bodies 10 and 11 in the opposite direction will cause the contact members 24 and 36 to be brought into engagement and the magnet will then be energized, to create a resistance between the solenoid and the armature 25 and thereby retard the relative movement of the bodies or members 10 and 11 in one direction.

Any suitable means may be provided for controlling the magnet and for varying the intensity of the magnetic field.

This is accomplished preferably by means of a rheostat 38 which is arranged in the conductor 37, the switch or member 39 of the rheostat being connected by means of a conductor 40 with a battery 41, the battery being grounded on one side as at 42.

The rheostat 38 and the switch 39 are arranged in a convenient position for the operator and if this device is used in connection with a motor vehicle the rheostat and switch may be placed on the instrument board.

When the switch or member 39 engages the stop 43 the magnetic field will be of the greatest intensity.

Should it be desired to render the magnet inactive the switch or member 39 may be moved off of the contacts of the rheostat 38 until it engages a stop device 44.

With this improved construction it will be manifest that the relative movement of these two bodies may be controlled and that the magnet will be responsive in its operation to the relative movement of the bodies 10 and 11 in one direction so that the relative movement of these bodies in the opposite direction will be controlled, retarded or modified by the magnet and armature constituting the shock absorbing or anti-vibrating device.

While the preferred form of the invention has been herein shown and described it is to be understood that various changes may be made in the details of construction and in the combination and arrangement of the several parts, within the scope of the claims, without departing from the spirit of this invention, and while the device is herein shown as being used in connection with vehicle springs, it is also to be understood that it is capable of efficient use in connection with other relatively moving bodies, the relative movement of which it is desired to control.

What is claimed as new is:—

1. An anti-vibration device comprising a magnetically controlled mechanism for a vehicle body supporting spring capable of exerting magnet resistance to movements of the spring in one direction, and means responsive to the movement of the spring in one direction for controlling the magnet to retard the succeeding movement of the spring in the other direction.

2. The combination with a pair of relatively movable members, a shock absorber interposed between said members and operating to permit a free yielding relative movement of said members in one direction, said shock absorber embodying means for electrically retarding or controlling the relative movement of said members in the opposite direction, and means for controlling at will the operation of the said shock absorber.

3. A shock absorber embodying a magnetically controlled mechanism for a vehicle body supporting spring capable of exerting magnetic resistance to movements of the spring in one direction, means responsive to the movement of the spring in one direction, for controlling the magnet to retard the successive movement of the spring in the other direction, and means for controlling at will the intensity of the field of the said mechanism.

4. The combination of a pair of relatively movable bodies, a shock absorber interposed between said bodies, said shock absorber embodying a solenoid connected with one of the said bodies and an armature connected with the other of said bodies, and means for automatically energizing and de-energizing the solenoid whereby the shock absorber will permit a free relative movement of the said bodies in one direction and will retard or control the relative movement of the said bodies in the opposite direction.

5. The combination of a pair of relatively movable bodies, a shock absorber interposed between said bodies, said shock absorber embodying a solenoid connected with one of the said bodies and an armature connected with the other of said bodies, means for automatically energizing and de-energizing the solenoid whereby the shock absorber will permit a free relative movement of the said bodies in one direction and will retard or control the relative movement of the said bodies in the opposite direction, and means for varying the intensity of the magnetic field.

In testimony whereof I have signed my name to this specification, on this 29th day of November, A. D. 1926.

RICHARD H. TRAVERS.